United States Patent [19]
Mailloux et al.

[11] Patent Number: 5,282,057
[45] Date of Patent: Jan. 25, 1994

[54] BIT-MAP IMAGE RESOLUTION CONVERTER

[75] Inventors: Louis D. Mailloux, Fairport; Robert E. Coward, Rochester, both of N.Y.

[73] Assignee: Xerox Corporation, Stamford, Conn.

[21] Appl. No.: 513,415

[22] Filed: Apr. 23, 1990

[51] Int. Cl.$^5$ .............................................. H04N 1/40
[52] U.S. Cl. ..................................... 358/445; 358/451
[58] Field of Search ............... 358/451, 433, 432, 456, 358/445

[56] References Cited

U.S. PATENT DOCUMENTS

| | | | |
|---|---|---|---|
| 3,096,398 | 4/1985 | Gabor et al. | |
| 4,508,463 | 4/1985 | Wang et al. | 400/124 |
| 4,528,693 | 7/1985 | Pearson et al. | 358/451 |
| 4,569,081 | 2/1986 | Mintzer et al. | 358/451 |
| 4,630,947 | 12/1986 | Yoshida et al. | 358/451 |
| 4,632,579 | 12/1986 | Takano et al. | 400/121 |
| 4,679,039 | 7/1987 | Neil et al. | 340/728 |
| 4,698,778 | 10/1987 | Ito et al. | 350/451 |
| 4,827,352 | 5/1989 | Yoneda et al. | 358/451 |
| 4,829,587 | 5/1989 | Glazer et al. | 382/47 |
| 4,841,375 | 6/1989 | Nakajima et al. | 358/451 |
| 4,860,118 | 8/1989 | Arimoto | 358/451 |
| 4,907,152 | 3/1990 | Lempriere | 364/413.14 |

*Primary Examiner*—Edward L. Coles, Sr.
*Assistant Examiner*—Thomas L. Stoll
*Attorney, Agent, or Firm*—Duane C. Basch; Ronald F. Chapuran

[57] ABSTRACT

A method for converting binary image data originally generated at a lower resolution into representative binary image data of a higher resolution, wherein the conversion ratio, or magnification factor, is an integer value. Also included are methods for smoothing the interpolated output image and thereby reducing objectionable visual characteristics observable in digitally encoded data using conventional magnification techniques.

8 Claims, 7 Drawing Sheets

BIT-MAP IMAGE RESOLUTION CONVERTER

BACKGROUND OF THE INVENTION

1. Field of the Invention

This invention relates generally to a system for magnifying a stored binary image by an integral value.

2. Description of the Prior Art

It is a generally known requirement of certain computer graphic output devices to convert the resolution of digital input images prior to outputting them at a predefined output resolution (pixel density or raster density). Specifically, printer systems capable of printing image data and/or character data have become widely used. Furthermore, printer systems of this type currently provide high resolution 600 spots per inch (spi) output capabilities which, in many cases, is higher than the input resolution available. This results in a situation where the performance of the printer may not be used to the maximum. For example, many existing input scanners and personal computer software packages operate at a medium image resolution of 300 spi, resulting in either an incompatibility with higher resolution printers or underutilization of the output capabilities of the high resolution printers.

For these reasons, current technology is focussed upon means for conversion of image data of one resolution to an image of a second resolution. It is a commonly known practice to implement this type of conversion through simple pixel and raster level operations, such as pixel doubling. Alternatively, more elaborate methods have been developed to facilitate this type of conversion, some of which are described below.

U.S. Pat. No. 3,096,398 to Gabor et al. discloses a method of supplementing the information received from a television broadcast system. The method of supplementation used involves interpolation between parts of the transmitted information to produce supplementary approximations of non-transmitted portions of a picture. A novel method of interpolation, contour interpolation, is taught wherein an apparatus is used to sense contours within selected picture portions and the interpolation to produce approximations to unselected picture portions is carried out both with regard to the position of such contours in the selected picture portions actually communicated and to their amplitudes.

U.S. Pat. No. 4,508,463 to Wang et al. teaches a technique and apparatus used with a dot matrix printer to provide high print resolution while printing at relatively high speeds. The higher print resolution is achieved through the use of a bi-directional printing mechanism including a method of offsetting the pin locations of the first printing pass with respect to corresponding pin locations in a pass of opposite direction. Furthermore, the technique taught includes a means of compact character encoding to reduce memory requirements within the printer system.

U.S. Pat. No. 4,632,579 to Takano et al. discloses a method of increasing print resolution by mechanically altering the relative position of the print head with respect to the paper during subsequent printing passes to increase the output resolution of the printer. Also disclosed is a means for controlling the activation of printing pins using a microprocessor based interpolation scheme to synthesize a secondary dot matrix pattern based upon a primary dot matrix pattern contained in memory for the associated character of pattern.

U.S. Pat. No. 4,679,039 to Neil et al. teaches a method for smoothing the display of contiguous parallel line segments in a manner to reduce the discontinuities that occur near the ends of the line segments. Smoothing is achieved by adding auxiliary dots of a lesser diameter below the larger main dots forming a first line segment in a given row and adding the same size auxiliary dots above the main dots of an adjacent line segment when the latter are in a row below the given row. The smoothing operation is optimized for multiple cases and line orientations and more than three different dot sizes can be used in the smoothing operation.

The prior art cited above has primarily disclosed methods of increasing the apparent resolution of an output device through a manipulation of the output device according to a predefined algorithm based on interpolation of adjacent image information. While these techniques are useful for the older technology printing and display devices, they are limited in application to the higher resolution output devices found in current computer graphics environments. Furthermore, this prior art does not teach any methods for altering the interpolated output data to achieve a more desirable visual appearance.

U.S. Pat. No. 4,827,352 to Yoneda et al. discloses an image processing apparatus comprising a means for receiving a continuous-tone input image and converting the input into a binary image through the use of a dither matrix. Subsequently, the binary image is converted to an alternate pixel-density based upon a window whose size is related to the original dither matrix. The conversion is accomplished using a processing means to analyze a window of the first binary image to determine an average image density within the window and subsequently applying a second dither matrix, to generate a binary image at an alternate resolution.

U.S. Pat. No. 4,841,375 to Nakajima et al. teaches an image resolution conversion apparatus for converting the pixel density of image data, comprising an input means for receiving image data, a selection means to determine the appropriate pixel-density conversion ration, and a pixel-density converting means. The pixel-density converting means comprises, inter alia, a conversion-pixel density operating means for calculating a conversion-pixel density based on the input pixel data and a binary encoding means for subsequently applying a threshold to the conversion-pixel density value and generating a conversion-pixel binary output. Also disclosed is a threshold-value setting means which dynamically adjusts the threshold value to be applied within the binary encoding means on the basis pattern detection applied to the original or reference image data.

The Yoneda and Nakajima patents above deal with the current output printing technology and the requirements for a means to convert images to alternate resolutions. Specifically, both define methods of converting resolutions of previously binary encoded images using a means for determining an estimated grey density for a region of the binary image. Subsequently, the grey density is used as an input to a binary encoder, either a dither matrix or thresholding function, thereby generating a converted output image. The Nakajima patent further discloses a means for altering the threshold over a local region, to alter the characteristics of the converted image.

Prior art, specifically the Yoneda and Nakajima patents, utilizes methods that approximate a grey density for a target area and subsequently encode the data to a converted binary format, potentially masking single pixels or adding structure to the converted image.

It is therefore an object of the present invention to enable magnification of the resolution of an input raster image into an output raster image of higher resolution or raster density. It is a further object of the present invention to automatically modify the output raster image to minimize abrupt edge effects caused by the digital encoding process. Furthermore, it is an object of the present invention to preserve single pixel structure during the resolution conversion of the input image.

Further advantages of the present invention will become apparent as the following description proceeds and the features characterizing the invention will be pointed out with particularity in the claims annexed to and forming a part of this specification.

SUMMARY OF THE INVENTION

Briefly, the present invention is a method for the conversion of binary image data originally generated at a lower resolution into representative binary image data at an integer-multiple higher resolution. Included within the resolution magnification algorithm are methods for smoothing the interpolated output image and thereby reducing objectionable visual characteristics observable in digitally encoded data using other conversion techniques.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
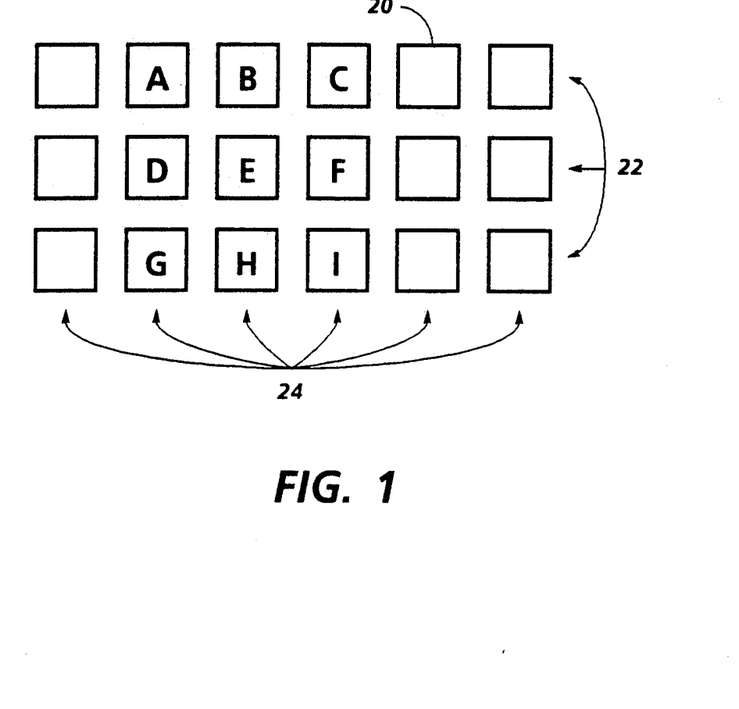
FIG. 1 is an illustration of a representative portion of an input raster image.

For a general understanding of the features of the present invention, reference is made to the drawings. FIG. 1 illustrates a representative segment of video data. Specifically, the segment consists of a plurality of binary image pixel positions 20, generally arranged horizontally into rows or scanlines 22. In addition, pixels 20 are arranged vertically into columns of pixels 24 so as to form an addressable matrix of image pixels 20. Hereinafter, all references to the binary state of an image pixel are intended to imply a white or black condition of the pixel.

In accordance with the present invention, the magnification, or equivalently the resolution conversion, of the image is implemented in a pixel by pixel fashion based upon neighboring image pixels. With reference to the 3 scanline by 3 pixel (3×3) array of original image pixels in FIG. 1, denoted alphabetically as pixels A through I, a center pixel E may be magnified by an integral multiple based upon the relative binary states of neighboring pixels A,B,C,D,F,G,H and I. The default binary state for the output pixel is determined by the binary state of the center pixel. Alteration of the default state is based upon the binary states of neighboring pixels and the relationships between sub-groups of neighboring pixels. Definition of the 3×3 original image array allows the generation of specific rules which may be applied symmetrically to all pixels to be generated from center pixel E.

Figure 2:
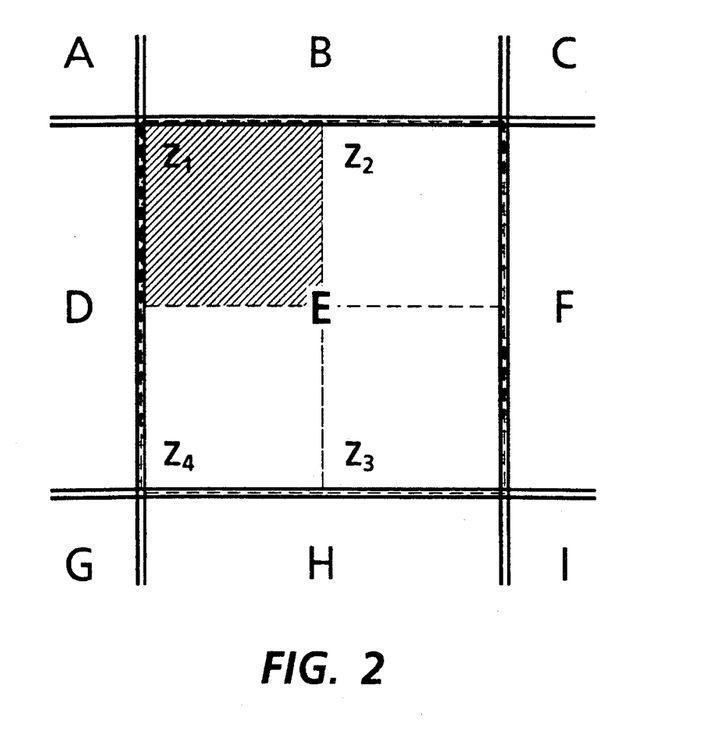
FIG. 2 is a detailed illustration of the 2× magnification method.

FIG. 2 depicts the center pixel E of FIG. 1, in an enlarged view with four magnified output pixels $Z_1, Z_2, Z_3, Z_4$ superimposed to represent the output of a 2× magnification operation. Determination of the binary state ($z_1$) of pixel $Z_1$ is made based on the binary state of original pixel E and the original surrounding pixels.

For 2× magnification, the binary state of symmetrically unique output pixel ($Z_1$) is made according to application of the following state determination rules in order:

1) if adjacent pixels (A,B,D) are white and the center pixel (E) is black and a series of 3 contiguous, non-adjacent pixels (G,H,I or H,I,F or I,F,C) are black, the output pixel ($z_1$) is white, or 2) if abutting pixels (B, D) are black and the center pixel (E) is white and a series of 3 contiguous, non-adjacent pixels (G,H,I or H,I,F or I,F,C) are white, the output pixel ($z_1$) is black, else 3) the output pixel ($z_1$) equals the binary value of center pixel E (default condition).

With respect to the above state determination rules, the term adjacent is intended to include all pixel positions with at least one point of contact with the magnified pixel position and the term non-adjacent is intended to include all remaining pixels not adjacent to the magnified pixel. The term abutting is used to represent all original pixel positions with an edge or side in common with the magnified pixel position.

Figure 3:
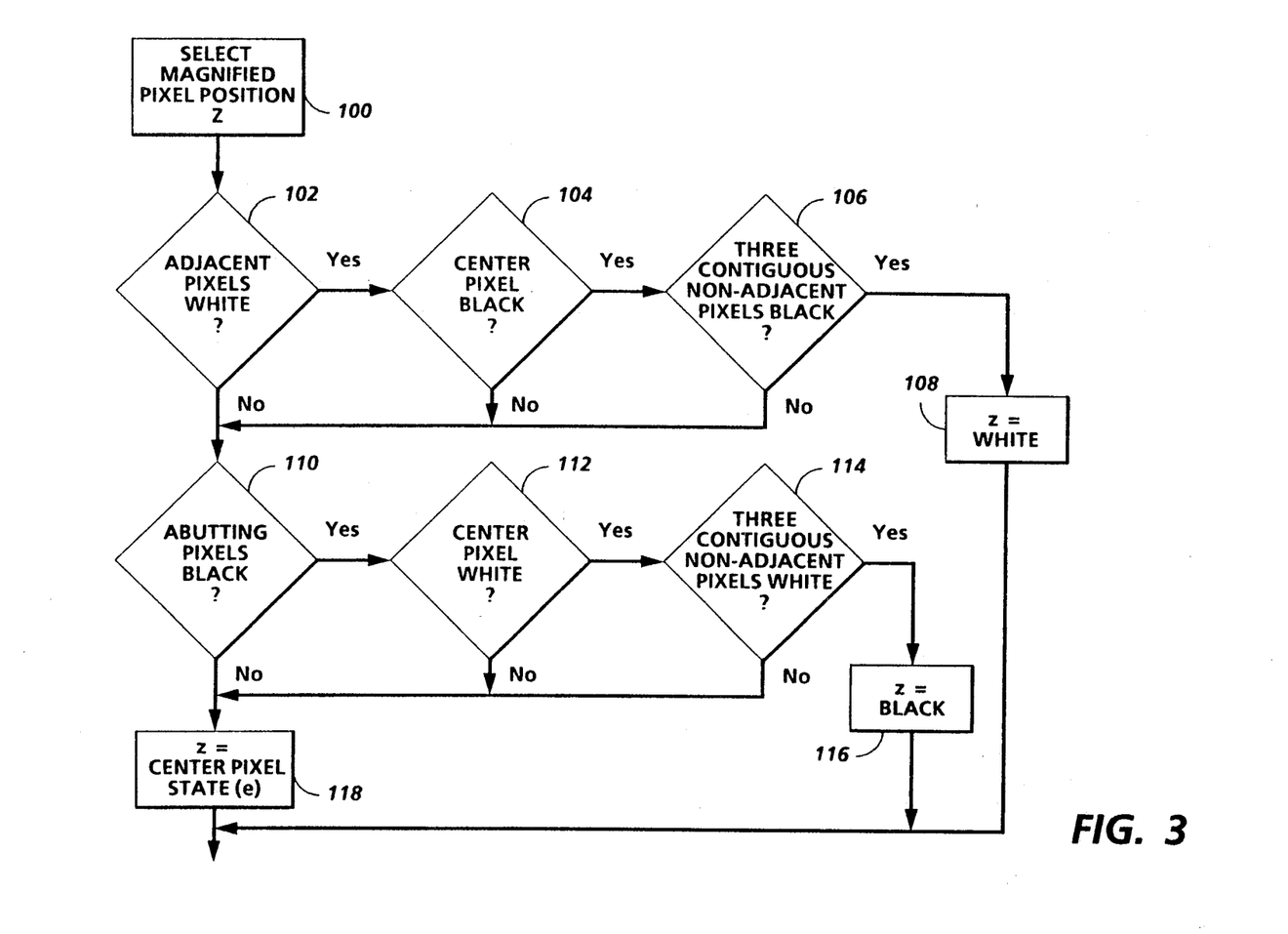
FIG. 3 is a detailed decision diagram representing the 2× magnification procedure.

Refer now to FIG. 3 which illustrates a generalized flowchart of the above state determination rules. The procedure starts at block 100, where the position of a magnified pixel Z, whose binary state (z) is to be determined, is selected. Upon selecting Z, adjacent, abutting, and non-adjacent pixels, within the 3×3 image matrix, are identified.

The first test, block 102, determines if all adjacent pixels are white. If so, tests to determine if the center pixel, block 104, and at least three contiguous, non-adjacent pixels, block 106, are black are carried out. Positive responses to the tests of blocks 104 and 106 will result in determination of the binary state pixel Z to be white and z will be set accordingly in block 108.

Failing any of the tests in blocks 102, 104 or 106, subsequent testing will continue in block 110. In block 110, a test is applied to determine if both abutting pixels are black. If so, further tests to determine if the center pixel, block 112, and at least three contiguous, non-adjacent pixels, block 114, are white are carried out. Positive responses to tests in blocks 110, 112, and 114 will result in determination of the binary state of pixel Z to be black and z will be set accordingly in block 116. Once again, failing any of the tests in blocks 110, 112, or 114 will result in establishment of the binary state of pixel Z to a value equivalent to the binary state of the center pixel E of the 3×3 image array.

To determine the binary state of the remaining three output pixels, the flowchart of FIG. 3 is implemented similarly, using the information contained in the 3×3 image array with respect to the three remaining symmetrically equivalent magnified pixel locations $Z_2$, $Z_3$, $Z_4$ of FIG. 2. For example, magnified pixel $Z_2$ of FIG. 2 would have pixels B,C and F of FIG. 1 as adjacent pixels and pixels A,D,G,H and I as non-adjacent pixels, while pixel E would remain the center pixel.

Figure 4:
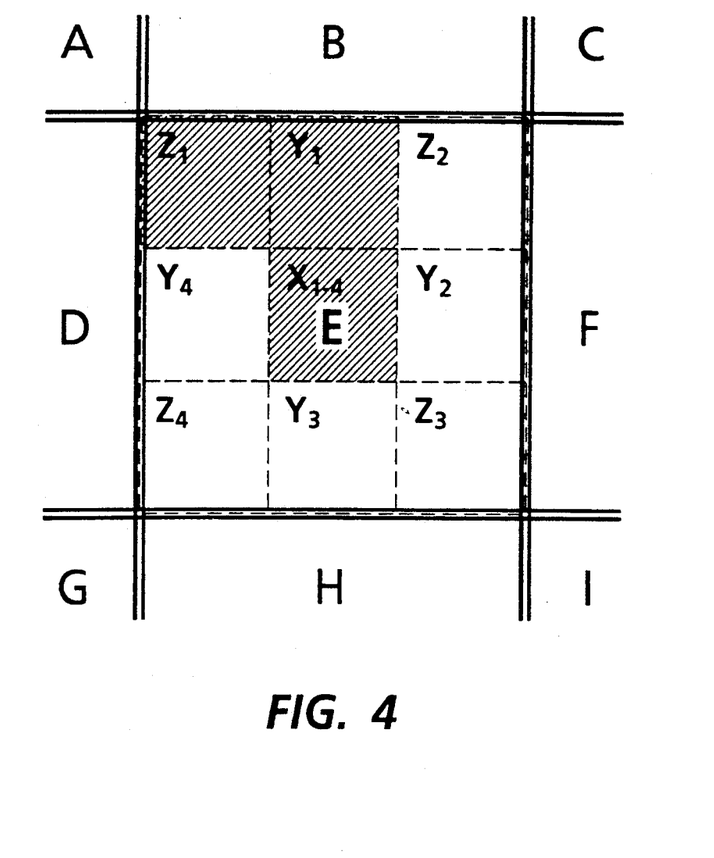
FIG. 4 is a detailed illustration of the 3× magnification method.

FIG. 4 depicts the 3× magnification of a center pixel E into nine output pixels in accordance with the present invention. In FIG. 4, three unique output pixel positions X,Y and Z are identified within the upper left quadrant of the magnified pixel array. When reflected about both horizontal and vertical axes passing through the center of original pixel E, the unique positions are further multiplied to form nine output pixels ($X_{1-4}$, $Y_1$, $Y_2$, $Y_3$, $Y_4$, $Z_1$, $Z_2$, $Z_3$, $Z_4$). The center output pixel $X_{1-4}$ is common to all four rotated positions and therefore is treated in a unique manner when applying the binary state determination rules.

Specifically, the binary states $x_n$, $y_n$ and $z_n$ of the output pixels $X_n$, $Y_n$ and $Z_n$ are determined by the state determination rules. Indicated below are the rules corresponding to the determination of the states of pixels $X_1$, $Y_1$, and $Z_1$, all of which are extensible to pixel positions which are their symmetrical equivalents ($X_n$, $Y_n$, $Z_n$):

1a) If adjacent pixels (A,B,D) are white and center pixel E is black and a linear series of three contiguous, non-adjacent pixels (G,H,I or I,F,C) are black, $z_1$ is white, or 1b) if abutting pixels (B,D) are black and center pixel E is white and a linear series of three contiguous, non-adjacent pixels (G,H,I or I,F,C) are white, $z_1$ is black, else 1c) $z_1$ equals the binary value of center pixel E (default condition).

2a) If pixels A,B,C and D are white and center pixel E is black and a linear series of three contiguous, non-adjacent pixels (G,H,I) are black, or if A,B,C and F are white and center pixel E is black and a linear series of three contiguous, non-adjacent pixels (G,H,I) are black, $y_1$ is white, or 2b) if pixels A,B,C and D are black and center pixel E is white and a linear series of three contiguous, non-adjacent pixels (G,H,I) are white, or if A,B,C and F are black and center pixel E is white and a linear series of three contiguous, non-adjacent pixels (G,H,I) are white, $y_1$ is black, else 2c) $y_1$ equals the binary value of center pixel E (default condition).

3a) If pixels A,B,C,D and F are white and pixels E,G,H,I are black, $x_1$ is white, or 3b) if pixels A,B,C,D and F are black and pixels E,G,H,I are white, $x_1$ is black, else 3c) $x_1$ equals the binary value of center pixel E (default condition).

The above rules are subsequently applied to all symmetrically equivalent output pixel positions ($X_{2,3,4}$, $Y_{2,3,4}$ and $Z_{2,3,4}$) to complete the determination of binary states ($x_{2,3,4}$, $y_{2,3,4}$ and $z_{2,3,4}$) for all output pixels.

Subsequent to determination of four values, $x_1$ through $x_4$, for the center magnified pixel X, the final binary output state (x) is determined by successively ORing resultant states $x_1$ through $x_4$.

The 2× and 3× magnification state determination rules, as described previously, are extensible to larger magnification levels. Following the examples illustrated for 2× and 3× magnification, the rules are established by first identifying symmetrically unique pixels within a given quadrant of the magnified pixel array. Subsequently, the rules are generally intended to analyze an area of the original image pixels to determine if the magnified pixel lies on an edge boundary within the image, as represented by a black to white or white to black transition.

Specifically, adjacent, abutting and non-adjacent original pixels are analyzed to locate edges in the original image. Given that edges are located, the binary output state of the original pixel is appropriately adjusted to achieve a "smoothed" appearance in the magnified output image. If no edge smoothing is required, the default value of the magnified output pixel is equivalent to the binary value of the original center pixel, in order to preserve single pixels within the original image.

In addition, a special case exists for magnification of the input image by an odd integer (i.e. 3×, 5×), where the center magnified pixel is present in all four quadrants of the magnified pixel array. Treatment of this special case includes the independent determination of the binary output state for the pixel based on processing in all four quadrants. Subsequently, the final binary output state of the center magnified pixel is determined by ORing the results from the four quadrants to arrive at an output pixel state.

Figure 5A:
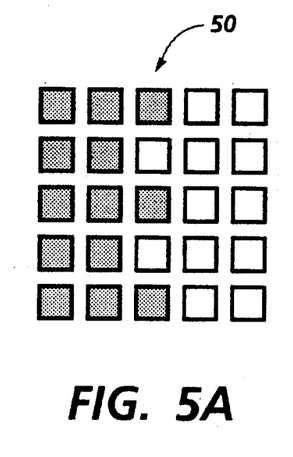
FIG. 5a is an illustrative example of a portion of an input image.
Figure 5B:
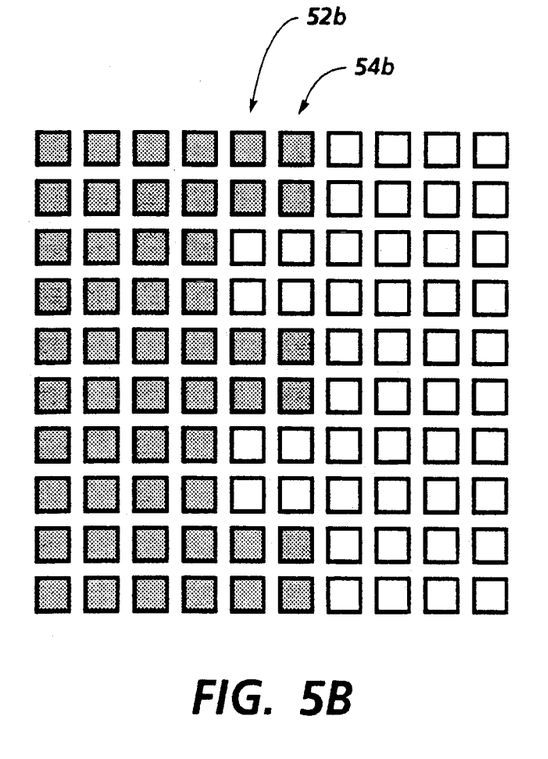
FIG. 5b is the resultant 2× magnification of the image represented by FIG. 5a using a known bit doubling technique.
Figure 5C:
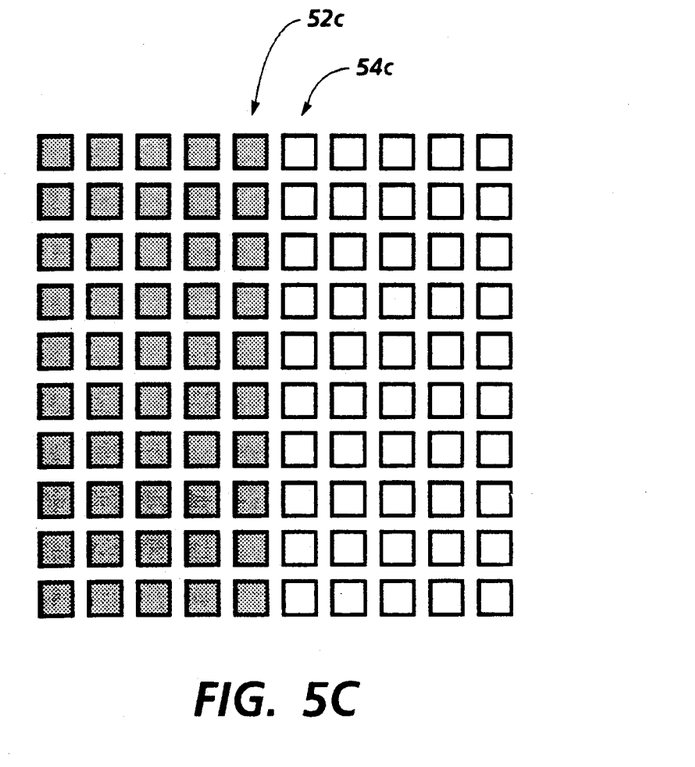
FIG. 5c is the resultant 2× magnification of the image represented by FIG. 5a in accordance with the present invention.

Refer now to FIGS. 5a, 5b and 5c which illustrate an example input image and two output images respectively. FIG. 5a is intended to depict a representative portion of an input image, possibly a vertical edge. The edge area, represented by column 50, illustrates a typical half-bitting effect of alternating black and white pixels, possibly caused by digital quantization of an edge in that area of the image.

FIG. 5b depicts the resultant output image after a bit doubling operation is performed on the original image of FIG. 5a, thereby achieving a 2× magnification. From FIG. 5b, it is evident that the bit doubling technique does not smooth the half-bitting present in column 50 of FIG. 5a, but rather magnifies the effect as evident in columns 52b and 54b. This type of "error" reproduction during resolution conversion operations is undesirable for the high resolution output devices currently available.

Alternatively, FIG. 5c depicts the resultant output image after 2× magnification in accordance with the present invention. As seen in columns 52c and 54c, the techniques used in the present invention enable smoothing of the half-bitting effects present in the original image to produce a visually acceptable high resolution image. In accordance with the present invention, the state determination rules for the 2× magnification were purposely designed to alter the binary state of pixels in close proximity to an edge in order to smooth the edge, thereby improving the visual perception of the edge when output at a higher resolution.

Figure 6A:
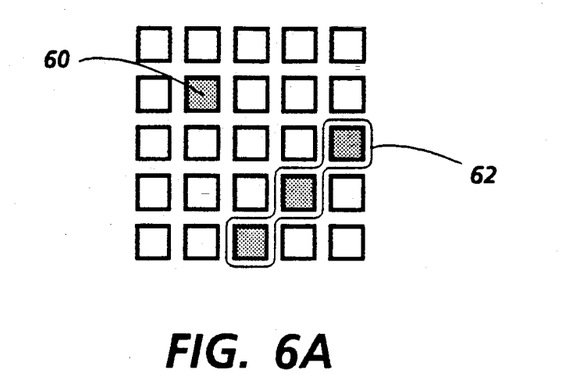
FIG. 6a is another example of a portion of an input image.
Figure 6B:
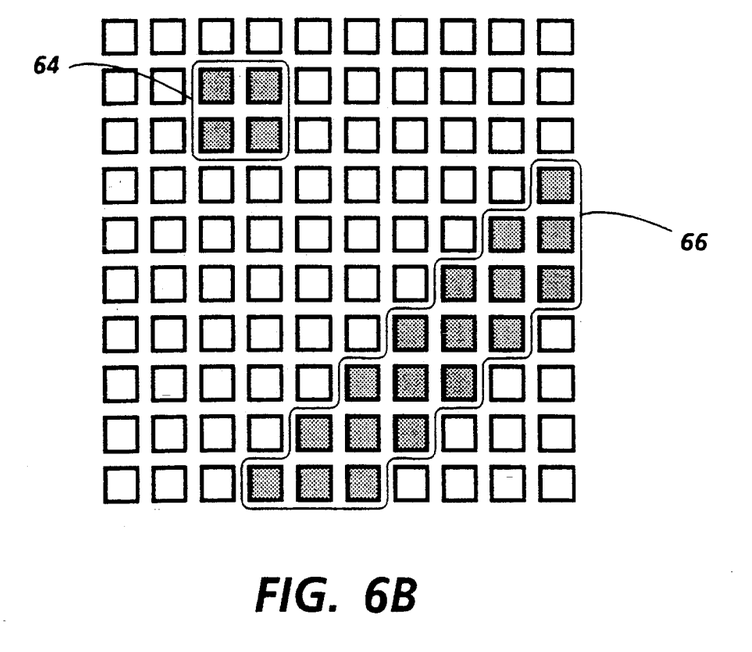
FIG. 6b is the resultant 2× magnification of the image represented by FIG. 6a in accordance with the present invention.

Refer now to FIGS. 6a and 6b, which illustrate an additional set of original and 2× magnification images. Specifically, FIG. 6a, illustrates an input image containing a single pixel 60 and a one pixel wide 45° line, represented by pixels 62. FIG. 6b illustrates the resultant 2× magnified image after processing in accordance with the present invention. The capability of the magnification technique to preserve single pixel structure is indicated by pixels 64 which represent the 2× magnification of pixel 60. Furthermore, FIG. 6b illustrates the resultant smoothed line, pixels 66 which are also a 2× magnification of the line in FIG. 6a, pixels 62.

Figure 7A:
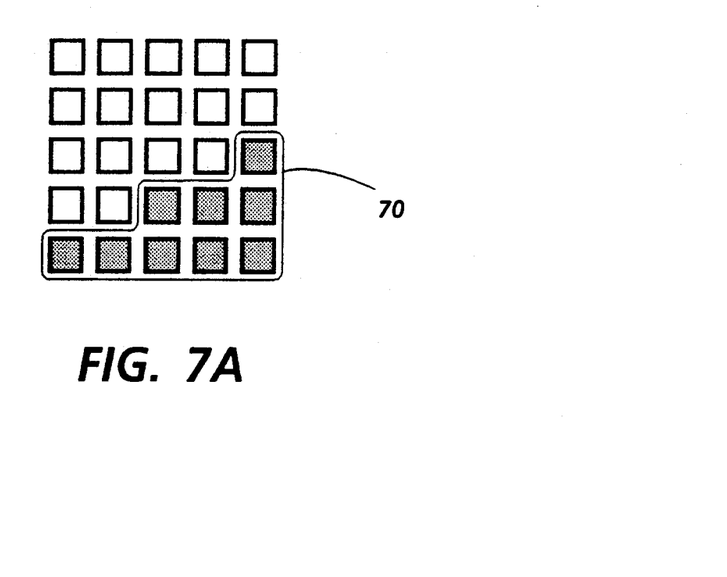
FIG. 7a is another example of a portion of an input image.
Figure 7B:
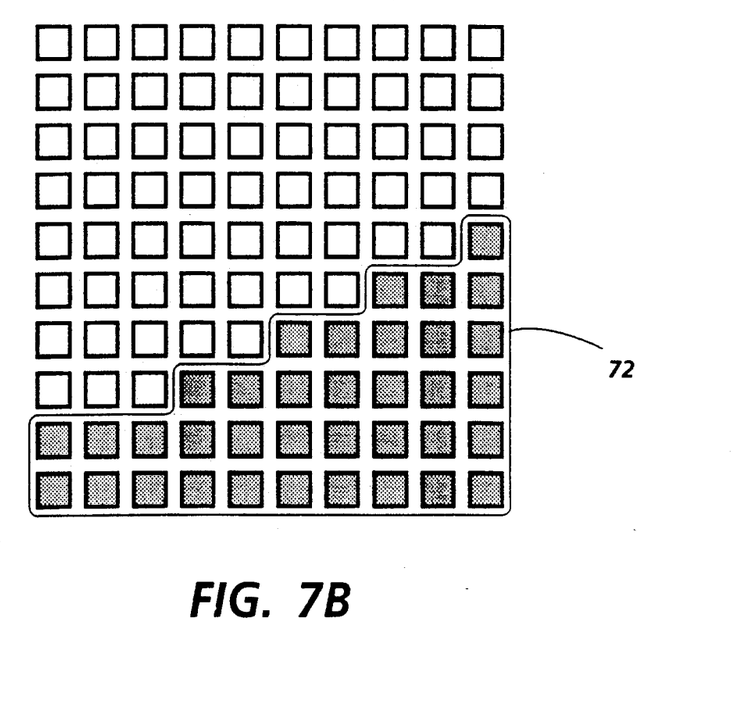
FIG. 7b is the resultant 2× magnification of the image represented by FIG. 7a in accordance with the present invention.

Finally, FIGS. 7a and 7b illustrate another example of the smoothing capabilities of the resolution conversion technique in accordance with the present invention. Shaded pixels 70 form an angled edge at the black to white transformation area. As described previously, resolution conversion of this type of an edge may result in the formation of "jaggies" along the edge. The jaggies are the direct result of the magnification of the inherent step type representation of an angled edge. While it is not possible to completely remove the jaggies from the higher resolution image, the visual impact of the jaggies is reduced to an acceptable level. Pixels 72 of FIG. 7b represent the converted output of the input image of FIG. 7a, using a conversion factor of 2×, in accordance with the present invention. The resultant steps seen in the black to white transition of FIG. 7b while perceptible at the size presented would be inherently less perceptible when produced at approximately one half of the present scale. In other words, if FIG. 7b had been produced at a 2× higher resolution, in a such a manner so as to maintain the same size of the original image area of FIG. 7a, the step height of the black to white edge would be one half of that evident in the original image, FIG. 7a.

The capability of the resolution conversion technique as demonstrated in the above description and related figures is therefore apparent. Furthermore, the state determination rules may be tailored to meet the requirements of specific applications, thereby providing different capabilities as desired. Finally, the 2× and 3× conversion examples hereby presented should be understood to be extensible, using the same principles as described, to other integral levels of magnification.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In a system for manipulating binary digital images represented by a plurality of original image pixels, the system having a memory for digitally storing images and means for displaying the image as a raster of pixels having either a black or white binary output state, the method of magnifying, by a predetermined magnification factor, the binary digital image pixels in two dimensions, including the steps of:
   1) defining a magnified pixel array to represent the magnification of each original pixel;
   2) identifying as symmetrically unique magnified pixel positions, pixels within said magnified pixel array having magnified pixel positions which correspond symmetrically about a center of said magnified pixel array;
   3) establishing state determination rules, comprising predetermined logical expressions which are applied in a serial fashion based on the positional relationships of said symmetrically unique magnified pixel positions with said original image pixels, and the binary states of said original image pixels, including the binary states of the original pixel, to govern the binary state displayed for each of said symmetrically unique magnified pixel positions;
   4) selecting an original image pixel (E) as a target pixel to be magnified;
   5) determining neighboring pixels which are adjacent to the target pixel (E) to establish an array of original image pixels inclusive of said target pixel;
   6) subdividing said target pixel (E) into an array of magnified image pixels, including the establishment of a set of symmetrically unique magnified pixel positions;
   7) assigning said state determination rules to govern the determination of the pixel state for each symmetrically unique magnified pixel position;
   8) determining a black or white binary state for each of said magnified image pixels according to said assigned state determination rule, and storing the determined binary state in the memory; and
   9) repeating steps 4 through 8 above until all original image pixels have been magnified, so as to display the magnified binary image stored in the memory.

2. In a system for manipulating binary digital images represented by a plurality of original image pixels, the system having a memory for digitally storing binary images and means for displaying the binary image as a raster of pixels having either a black or white binary output state, the method of magnifying, by a predetermined integral magnification factor, the stored binary image in two dimensions, including the steps of:
   1) defining a magnified pixel array to represent the magnification of each original pixel;
   2) identifying as symmetrically unique magnified pixel positions, pixels within said magnified pixel array having magnified pixel positions which correspond symmetrically about a center of said magnified pixel array;
   3) establishing at least one set of state determination rules based on the positional relationships of said symmetrically unique magnified pixel positions and the original image pixels;
   4) selecting an original image pixel E as a target pixel to be magnified;
   5) determining all neighboring pixels which are adjacent to the target pixel E to establish a 3×3 array of original image pixels inclusive of said target pixel;
   6) subdividing said target pixel E into an array of magnified image pixels, including the establishment of the symmetrically unique magnified pixel positions;
   7) selecting the set of state determination rules for application to said magnified image pixels;
   8) assigning a black or white binary state to each of said magnified image pixels according to said state determination rules, which are applied as a function of the binary states of said original image pixel E and at least one of said neighboring pixels; and 9) repeating steps 4 through 8 above until all original image pixels have been magnified so as to produce a magnified binary image.

3. The method of claim 2 wherein step 2, determining all symmetrically unique magnified pixel positions within said magnified pixel array, comprises the steps of:
   dividing said magnified pixel array into four quadrants defined by horizontal and vertical axes which intersect at the center of the array;
   selecting a pixel within a first quadrant of said magnified pixel array; and
   further selecting pixel positions within each of the three remaining quadrants which are positionally symmetric with the first quadrant pixel and thereby establishing a set of symmetrically unique magnified pixel positions.

4. The method of claim 2 wherein step 3, establishing a set of state determination rules based on the positional relationships of said symmetrically unique magnified pixels and the original image pixels, comprises the steps of:
   selecting a symmetrically unique magnified pixel position; and
   defining a set of state determination rules that will preserve the existence of a single inverted pixel in an area of pixels with the same binary state and that will invert the binary value of a pixel determined to be extending from an edge within the original image as defined by a distinct transition, black to white, within the $3 \times 3$ original pixel array.

5. The method of claim 2 wherein step 7, determining which set of predefined state determination rules apply to each of said magnified image pixels, comprises the steps of:
   establishing the positional relationship of each of said magnified pixel positions;
   determining which of said symmetrically unique magnified pixel positions is representative of each of said magnified pixel positions; and
   selecting one of a plurality of sets of state determination rules which has been specifically established for said symmetrically unique pixel position.

6. In a system for manipulating binary digital images represented by a plurality of original image pixels, the system having a memory for digitally storing images and means for displaying the image as a raster of pixels having either a black or white binary output state, the method of magnifying, by a factor of 2, the binary digital image pixels in two dimensions, including the steps of:
   1) selecting an original image pixel (E) as a target pixel to be magnified;
   2) defining a $3 \times 3$ array of image pixels (A through I) surrounding said original pixel (E);
   3) defining a $2 \times 2$ magnified image pixel array ($Z_1$ through $Z_4$) to represent the magnification of said original pixel (E);
   4) identifying magnified image pixel position Z as a symmetrically unique magnified pixel position within said magnified image pixel array, such that the symmetrically unique magnified pixel position Z corresponds symmetrically with each pixel of said magnified image pixel array about a center thereof;
   5) applying a set of state determination rules to determine a black or white binary output state for each pixel of said $2 \times 2$ magnified image pixel array ($Z_1$ through $Z_4$); and
   6) repeating steps 1 through 5 above until all original image pixels have been so selected and magnified so as to produce a magnified binary image for display.

7. The state determination rules as recited in claim 6, further comprising the steps of:
   1) setting the binary output state of said magnified pixel equivalent to the binary output state of said original pixel (E);
   2) determining that adjacent original pixels are white while said original pixel (E) and a series of three contiguous, non-adjacent original pixels are black, and if so setting the binary output state of said magnified pixel to white; and
   3) determining that abutting original pixels are black while said original pixel (E) and three contiguous, non-adjacent original pixels are white, and if so setting the binary output state of said magnified pixel to black.

8. In a system for manipulating binary digital images represented by a plurality of original image pixels, the system having a memory for digitally storing images and a means for displaying the image as a raster of pixels having either a black or white binary output state, the method of magnifying, by a factor of 3, the binary digital image pixels in two dimensions, including the steps of:
   1) selecting an original image pixel (E) as a target pixel to be magnified;
   2) defining a $3 \times 3$ array of image pixels (A-I) surrounding said original pixel (E);
   3) defining a $3 \times 3$ magnified image pixel array having magnified pixel positions $X_{1-4}$, $Y_1$, $Y_2$, $Y_3$, $Y_4$, $Z_1$, $Z_2$, $Z_3$, $Z_4$, to represent the magnification of said original pixel (E);
   4) identifying the magnified image pixel positions X, Y, and Z as symmetrically unique magnified pixel positions within a first quadrant of said magnified image pixel array, wherein each of said symmetrically unique magnified pixel positions X, Y, and Z indicate subsets of said magnified pixel positions which correspond symmetrically about a center of said magnified image pixel array;
   5) determining if a magnified image pixel is located in symmetrically unique magnified pixel position X, and if so;
      a) selecting one of four possible pixel orientations ($X_n$) for said symmetrically unique position X;
      b) setting the binary output state of said magnified pixel ($X_n$) equivalent to the binary state of said pixel (E);
      c) further determining that original pixels in relative positions A, B, C, D and F are white while pixel (E) and all remaining original pixels are black, and if so setting the binary output state of said magnified pixel to white; or
      d) further determining that, original pixels in relative positions A, B, C, D and F are black while pixel (E) and all remaining original pixels are white, and if so setting the binary output state of said magnified pixel to black; and
      e) repeating steps 5a through 5d above for all possible pixel orientations;
      f) ORing the binary output states of the four generated output pixels to arrive a representative binary output state for said pixel position X; or 6) determining if the magnified image pixel is located in symmetrically unique magnified pixel position Y, and if so;
   a) selecting one of four possible pixel orientations ($Y_n$) for said symmetrically unique position Y;
   b) setting the binary output state of said magnified pixel equivalent to the binary state of said original pixel (E);
   c) further determining that original pixels in relative positions A, B, C and D are white while original pixel (E) and a linear series of three contiguous, non-adjacent original pixels are white, and if so setting the binary output state of said magnified pixel to white; or
   d) further determining that original pixels in relative positions A, B, C and F are white while original pixel (E) and a linear series of three contiguous, non-adjacent original pixels are black, and if so setting the binary output state of said magnified pixel to white; or
   e) further determining that original pixels in relative positions A, B, C and D are black while original pixel (E) and a linear series of three contiguous, non-adjacent original pixels are white, and if so setting the binary output state of said magnified pixel to black; or
   f) further determining that original pixels in relative positions A, B, C and F are black and original pixel (E) and a linear series of three contiguous, non-adjacent original pixels are white, and if so setting the binary output state of said magnified pixel to black; and
   g) repeating steps 6a through 6f above for all possible pixel orientations; or
7) determining if the magnified image pixel is located in symmetrically unique magnified pixel position Z, and if so;
   a) selecting one of four possible pixel orientations ($Z_n$) for said symmetrically unique position Z;
   b) setting the binary output state of said magnified pixel equivalent to the binary state of said original pixel (E);
   c) further determining if adjacent original pixels are white while original pixel (E) and a linear series of three contiguous, non-adjacent original pixels are black, and if so setting the binary output state of said magnified pixel to white; or
   d) further determining if abutting original pixels are black and original pixel (E) an a linear series of three contiguous, non-adjacent original pixels are white, and if so setting the binary output state of said magnified pixel to black; and
   e) repeating steps 7a through 7d above for all possible orientations; and
8) repeating steps 1 through 5 above until all original image pixels have been so selected and magnified.

* * * * *